United States Patent
Weissenmayer

(10) Patent No.: US 12,130,594 B2
(45) Date of Patent: Oct. 29, 2024

(54) METHOD FOR DETERMINING AT LEAST ONE SYSTEM STATE BY MEANS OF A KALMAN FILTER

(71) Applicant: Robert Bosch GmbH, Stuttgart (DE)

(72) Inventor: Simon Weissenmayer, Flein (DE)

(73) Assignee: Robert Bosch GmbH, Stuttgart (DE)

( * ) Notice: Subject to any disclaimer, the term of this patent is extended or adjusted under 35 U.S.C. 154(b) by 512 days.

(21) Appl. No.: 17/396,854

(22) Filed: Aug. 9, 2021

(65) Prior Publication Data
US 2022/0043403 A1    Feb. 10, 2022

(30) Foreign Application Priority Data

Aug. 10, 2020 (DE) .................... 10 2020 210 080.2

(51) Int. Cl.
   *G05B 13/02*      (2006.01)
   *G06F 17/16*      (2006.01)
   *G06F 17/18*      (2006.01)

(52) U.S. Cl.
CPC ....... *G05B 13/0215* (2013.01); *G05B 13/024* (2013.01); *G06F 17/16* (2013.01); *G06F 17/18* (2013.01)

(58) Field of Classification Search
None
See application file for complete search history.

(56) References Cited

U.S. PATENT DOCUMENTS

| | | | | |
|---|---|---|---|---|
| 4,783,744 A | * | 11/1988 | Yueh | F41G 7/30 702/85 |
| 6,002,974 A | * | 12/1999 | Schiffmann | B60R 22/46 340/440 |
| 6,816,804 B1 | * | 11/2004 | Lee | B60W 40/105 701/72 |
| 2005/0101248 A1 | * | 5/2005 | Vollath | G01S 19/44 342/357.27 |
| 2018/0284150 A1 | * | 10/2018 | Takahashi | G01C 21/188 |

OTHER PUBLICATIONS

Chandail, Rahul. Vision Augmented State Estimation with Fault Tolerance. MS thesis. University of Waterloo, 2018. (Year: 2018).*

* cited by examiner

*Primary Examiner* — Carlos R Ortiz Rodriguez
(74) *Attorney, Agent, or Firm* — Maginot, Moore & Beck LLP

(57) ABSTRACT

A method determines at least one system state of a system using a Kalman filter. At least one measured value, measured by at least one sensor of the system, is supplied to the Kalman filter. The method includes estimating the at least one system state using the Kalman filter. An estimation result and at least one associated item of information relating to a reliability of the estimation result are output. The method further includes determining a discrepancy between at least one model value associated with the estimation result and at least one measured value associated with the estimation result, and correcting the at least one associated item of information relating to the reliability of the estimation result using the determined discrepancy.

9 Claims, 6 Drawing Sheets

METHOD FOR DETERMINING AT LEAST ONE SYSTEM STATE BY MEANS OF A KALMAN FILTER

This application claims priority under 35 U.S.C. § 119 to patent application no. DE 102020210 080.2, filed on Aug. 10, 2020 in Germany, the disclosure of which is incorporated herein by reference in its entirety.

The disclosure relates to a method for determining at least one system state by means of a Kalman filter, to a computer program for carrying out the method, to a machine-readable storage medium on which the computer program is stored, and to a system for determining the position of a mobile object, such as in particular a vehicle, configured to carry out the method. The disclosure can be used, in particular, in connection with at least partially automated or autonomous driving.

Background

Kalman filters are used to iteratively estimate system states on the basis of observations which are usually erroneous. In this context, Kalman filters have proved to be particularly advantageous, in particular for applications in which sensor information from different sensors must be combined (or fused) with model information, in particular. In addition, Kalman filters are often used in embedded systems since their calculations are advantageously accurate and robust. In addition, microcontrollers can carry out the calculations of a Kalman filter in an advantageously efficient manner.

The Kalman filter equations can be described in matrix notation as follows:

$$\hat{x}_k = F_k \hat{x}_{k-1} + B_k \vec{u_k} \quad \text{(EQ 1)}$$

$$P_k = F_k P_{k-1} F_k^T + Q_k \quad \text{(EQ 2)}$$

$$\underbrace{H_k K'}_{K} = \underbrace{H_k P_k H_k^T}_{\Sigma_0} \left( \underbrace{H_k P_k H_k^T}_{\Sigma_0} + \underbrace{R_k}_{\Sigma_1} \right)^{-1} \quad \text{(EQ 3)}$$

$$\underbrace{H_k \hat{x}'_k}_{\mu'} = \underbrace{H_k \hat{x}_k}_{\mu_0} + \underbrace{H_k K'}_{K} \left( \underbrace{\overrightarrow{z_k}}_{\mu_1} - \underbrace{H_k \hat{x}_k}_{\mu_0} \right) \quad \text{(EQ 4)}$$

$$\underbrace{H_k P'_k H_k^T}_{\Sigma'} = \underbrace{H_k P_k H_k^T}_{\Sigma_0} - \underbrace{H_k K'}_{K} \underbrace{H_k P_k H_k^T}_{\Sigma_0} \quad \text{(EQ 5)}$$

The explicit equations, with the symbols K, $\Sigma'$, $\Sigma_0$, $\Sigma_1$, $\mu'$, $\mu_0$, $\mu_1$, can be used, in particular, when there is a corresponding model variable with the same scaling for each measurement variable and/or conversely there is a corresponding measurement variable with the same scaling for each model variable. If this is not the case, it is possible to use, for example, equations EQ3 to EQ5 with the symbols H, K', P, R, $\hat{x}$, z. For a numerical calculation, these equations may be changed to an explicit form beforehand, which can be effected, in particular, by dividing H and $H^T$ between both sides of the equation(s).

Equations EQ1 and EQ2 describe the iterative estimation process of the Kalman filter and equations EQ3 to EQ5 described the correction or fusion of the iteratively estimated model values with measured values captured using sensors. For further explanation, reference is made to the description of a typical structure of a Kalman filter in connection with FIG. 1.

However, Kalman filters are comparatively complicated and there are numerous setting options (in particular the system matrix $F_k$, the variance matrix $R_k$ of the measurement noise and the variance matrix $Q_k$ of the system noise) which must be selected and/or set for the respective system behavior to be described. This makes it difficult to use the Kalman filter for new applications and/or to maintain existing applications.

So-called extended Kalman filters are also sometimes used in order to also be able to model non-linear dynamic processes and/or so-called adaptive Kalman filters (or ROSE filters) are also sometimes used in order to be able to adapt the numerous setting options, in particular the values of the matrices $R_k$ and $Q_k$ for the measurement and system noise, automatically during the runtime with the aid of additional filters. However, a comparatively large amount of effort is involved in this case in designing or configuring the additional filters, wherein the ROSE filter, with its additional filters, is even more difficult to configure.

SUMMARY

According to Claim 1, a method for determining at least one system state by means of a Kalman filter is proposed here, wherein at least one measured value measured by at least one sensor of the system is supplied to the Kalman filter, comprising at least the following steps of: a) estimating the system state by means of the Kalman filter, wherein an estimation result and at least one associated item of information relating to the reliability of the estimation result are output, b) determining a discrepancy between at least one model value associated with the estimation and at least one measured value associated with the estimation, c) correcting at least one item of information relating to the reliability of the estimation using the determined discrepancy.

The stated order of steps a), b) and c) is exemplary and may be carried out in the stated order at least once during a normal operating procedure, for example, in order to carry out the method. Alternatively or additionally, steps a), b) and c) can be at least partially carried out in a parallel manner or at the same time. The method can be carried out, for example, by a control unit, for instance a (micro)controller which may be part of the system also described here, for example.

The method advantageously makes it possible to provide a Kalman filter comprising a plausibility check of the prediction (or estimation) and/or measurement. In this context, the method can contribute, in particular, to extending an (otherwise typical) Kalman filter in such a manner that inconsistencies or a discrepancy caused by (measurement) errors and/or great inaccuracies during modeling and/or configuration and/or deviations from the reference situations considered caused by abnormal measured values can be detected. A difference between the modeled values and the measured values is already determined in the conventional Kalman filter equations in the term in brackets in equation EQ4 above. However, this difference is taken into account there only when determining the fused (new) state vector $\hat{x}_k'$ and is attributed only to the model value or model state. This can also still be carried out in the method described here. In addition, it is now proposed here for the first time to attribute a discrepancy to the information relating to the reliability of the estimation, in particular to the estimation uncertainty (symbol: P or $\Sigma_0$) and/or the measurement uncertainty (symbol: R or $\Sigma_1$). In a particularly advantageous manner, this contributes to the level of the discrepancy (directly)

affecting the level of at least one measure of the reliability of the estimation. For example, the measure of the estimation uncertainty (symbol: P) and/or the measurement uncertainty (symbol: R) can be changed accordingly or on the basis of the determined discrepancy, in particular can increase with increasing discrepancy. In a particularly advantageous manner, the method therefore for the first time allows a distance between (mutually associated) model values and measured values to also be able to directly affect the information relating to the reliability of the estimation result.

The described consideration of the discrepancy and, in particular, a (corresponding) reduction in at least one item of information relating to the reliability of the estimation, in the event of values for the model value and the measured value which are far apart, are particularly advantageous, in particular for safety-critical applications. The safety-critical applications which are of particular focus include, in particular, at least partially automated or autonomous driving, during which the reliability of the estimation result is generally intended to be within defined bandwidths and/or is intended to be able to be determined as exactly as possible. In addition, if a discrepancy (of a physical variable) has been detected or determined, the method can contribute to measured values being able to be given a higher weighting than abnormal model values or vice versa, for example.

The method contributes, in particular, to (continuously) determining system states by means of a Kalman filter and on the basis of sensor data. Measured values from a plurality of different sensors or different types of sensors of the system can be supplied to the Kalman filter in order to carry out an estimation taking these measured values into account. The at least one system state may comprise, for example, the (current) (intrinsic) position of a mobile object or mobile part which can be moved, in particular, along the Earth's surface, for instance a (motor) vehicle (automobile), a ship, an aircraft, a smartphone or a smartwatch. Furthermore, the at least one system state may comprise a (current) speed, a (current) direction of movement and/or a (current) acceleration of the object. The use of the described method is advantageous, in principle, for any desired sensor data fusion tasks, for example for determining positions, detecting objects and/or controlling the driving dynamics of a vehicle. In addition, the described method can also be used to model transmission properties of a sensor in order to reduce measurement noise and other interfering influences on the sensor signal, for example.

In step a), the system state is estimated by means of the Kalman filter, wherein an estimation result and at least one associated item of information relating to the reliability of the estimation result are output. An in particular corrected or fused (or new) model value vector (symbol: $\mu'$) and/or an in particular corrected or fused (or new) state vector (symbol: $\hat{x}_k'$) can be output as the estimation result, for example. An estimation uncertainty, for example an in particular corrected or fused covariance matrix (symbol: $P_k'$ or $\Sigma'$), can be output as the associated information relating to the reliability of the estimation result, for example.

In step b), a discrepancy between at least one model value associated with the estimation and at least one measured value associated with the estimation is determined. For example, it is possible to determine a discrepancy between the model values associated with the estimation or the model value vector (symbol: $\mu_0$) associated with the estimation and the measured values associated with the estimation or the measured value vector (symbol: $\mu_1$) associated with the estimation. In particular, the model value and/or the measured value can be quadratically included in the calculation of the discrepancy. The square error between the model value vector (symbol: $\mu_0$) and the fused model value vector (symbol: $\mu'$) and/or the square error between the measured value vector (symbol: $\mu_1$) and the fused model value vector (symbol: $\mu'$) is/are preferably taken into account, in particular summed, when calculating the discrepancy. Both may be weighted using the respective covariance matrix of the model value vector and of the measured value vector.

In step c), at least one item of information relating to the reliability of the estimation is corrected using the determined discrepancy. The information relating to the reliability of the estimation which is corrected here may be, for example, the information relating to the reliability of the estimation result mentioned in step a). In this context, an in particular fused estimation uncertainty, for instance a fused covariance matrix (symbol: $P_k'$ or $\Sigma'$), can be corrected, for example, in step c), for example by adding the determined discrepancy. Alternatively or additionally, a (non-fused) estimation uncertainty (symbol: P) and/or a measurement uncertainty (symbol: R) can be corrected, for example, in step c). In this context, a covariance matrix (symbol: $\Sigma_0$) of the model value vector (symbol: $\mu_0$) and/or a covariance matrix (symbol: $\Sigma_1$) of the measured value vector (symbol: $\mu_1$) can be corrected, for example, in particular by adding the determined discrepancy.

The use of the discrepancy advantageously contributes to improving or correcting the calculation of the variance (symbol: $P_k'$) from the equation (EQ5) stated above by taking into account the measured values (symbol: $\vec{z}_k$) and the modeled states (symbol: $\hat{x}_k$). In this case, in particular if there are implausibly large differences between the measured values (symbol: $\vec{z}_k$) and the modeled states (symbol: $\hat{x}_k$) or if there is a large discrepancy (symbol: D or d), the calculated variance (symbol: $P_k'$) can be increased. However, the discrepancy is advantageously taken into account continuously and, in particular, not only when there are implausibly large differences.

The correction can be carried out, in particular, in such a manner that the probability density distribution of the at least one item of information relating to the reliability of the estimation, preferably the fused model uncertainty (symbol: $P_k'$ or $\Sigma'$), is adapted. This adaptation can be carried out, for example, in such a manner that the probability density distribution becomes broader and/or a greater overlap with the probability density distributions of model uncertainty (symbol: P or $\Sigma_0$) and measurement uncertainty (symbol: R or $\Sigma_1$) can be achieved. This can advantageously contribute to being able to better consider cases in which, although the measured values and model values have each been calculated with a (presumably) high certainty, they are actually comparatively far apart. The correction can therefore contribute to undetected measurement errors and/or design errors of the model advantageously having less influence on the estimation.

According to one advantageous configuration, it is proposed that the system is a system for determining the position of a (motor) vehicle. The system may be at least partially arranged in or on the vehicle. The vehicle may be advantageously configured for at least partially automated and/or autonomous driving operation, for example by means of an appropriately configured control unit. The control unit may be connected to the system in order to receive position data from the system. The system may comprise a plurality of sensors, in particular different sensors or different types of sensors, or may be connected to sensors of the vehicle. The sensors may comprise, for example, at least one GNSS sensor and an (optical or acoustic) environmental sensor, for example a camera sensor, a lidar sensor, a radar sensor, an ultrasonic sensor or the like. The measured values from the sensors may be fused by means of the method described here or by means of the Kalman filter.

According to a further advantageous configuration, it is proposed that the correction according to step c) is carried out continuously. In other words, this can also be described, in particular, in such a manner that a discrepancy is determined for each time step of the Kalman filter as far as possible and is used for correction, in particular is added to the at least one item of information relating to the reliability of the estimation. Continuous correction differs, for example, from a threshold value comparison for plausibility checking, in which correction is carried out when a determined discrepancy is above a defined threshold value. In contrast, continuous determination of the discrepancy and use of this discrepancy for correction according to step c) advantageously contributes to a degree of plausibility being able to be captured and taken into account continuously. In this case, it is possible to intervene on the basis of the degree, in particular. This enables advantageous monitoring which is continuous, in particular in contrast to threshold value comparisons.

According to a further advantageous configuration, it is proposed that the discrepancy is used to correct at least one confidence value of at least one model value and/or of at least one measured value of the Kalman filter. In this context, the discrepancy can be used, for example, to correct the scatter values of the at least one model value or of the model value vector (symbol: $\mu_0$) and/or the scatter values of the at least one measured value or of the measured value vector (symbol: $\mu_1$), for example by adding the discrepancy (or the degree of discrepancy) to the relevant values. The discrepancy can preferably be used to correct the variance or covariance matrix (symbol: $\Sigma_0$) of the at least one model value or of the model value vector (symbol: $\mu_0$) and/or the variance or covariance matrix (symbol: $\Sigma_1$) of the at least one measured value or of the measured value vector (symbol: $\mu_1$), for example by adding the discrepancy to the relevant variance or covariance matrix.

According to a further advantageous configuration, it is proposed that the discrepancy is determined or calculated using the following elements: at least one model value (associated with the estimation), at least one measured value (associated with the estimation), at least one fused model value (associated with the estimation and fused from the model value and measured value), and at least one Kalman gain or, as an alternative to the Kalman gain, using at least one covariance of the at least one measured value, and at least one covariance of the at least one model value.

In particular, (respective) square errors of the model value and/or of the measured value can be determined in this case. The determined square errors can be added to form the discrepancy. The square error between the model value and the fused model value and/or the square error between the measured value and the fused model value is/are preferably taken into account, in particular added, when calculating the discrepancy. Both can be weighted using the respective covariance of the model value and of the measured value, respectively.

For example, the discrepancy can be determined according to the following formula (equation EQ6) (used, in particular, for the purposes of derivation and/or understanding of the following explicit equations):

$$d = \Sigma' \left( \frac{(\mu_0 - \mu')^2}{\Sigma_0} + \frac{(\mu_1 - \mu')^2}{\Sigma_1} \right) \quad (EQ\ 6)$$

in which d describes the discrepancy, $\mu_0$ describes the model value, $\mu_1$ describes the measured value, $\mu'$ describes the fused model value, $\Sigma_0$ describes the covariance of the model value, $\Sigma_1$ describes the covariance of the measured value and $\Sigma'$ describes the covariance of the fused model value. In this case, the variables mentioned may be, in principle, one-dimensional or multi-dimensional. In the multi-dimensional case, D is accordingly the discrepancy matrix, $\mu_0$ is the model value vector, $\mu_1$ is the measured value vector, $\mu'$ is the fused model value vector, $\Sigma_0$ is the covariance matrix of the model value vector, $\Sigma_1$ is the covariance matrix of the measured value vector and $\Sigma'$ is the covariance matrix of the fused model value vector. In this context, the covariance matrix of the fused model value vector can be determined using the following formula (equation EQ6a):

$$\Sigma' = \frac{1}{\frac{1}{\Sigma_0} + \frac{1}{\Sigma_1}} \quad (EQ\ 7a)$$

The discrepancy d between the model value and the measured value can therefore be advantageously determined on the basis of the sum of the square deviation between the modeled value $\mu_0$ and the fused mean value $\mu'$, based on the variance $\Sigma_0$ of the modeled value, and the square deviation between the measured value $\mu_1$ and the fused mean value $\mu'$, based on the variance $\Sigma_1$ of the measured value, which sum was weighted with the previous calculation of the variance $\Sigma'$.

The discrepancy determined in this manner or the degree of discrepancy can be added subsequently or in step c) when calculating the variance (symbol: $\Sigma'$ or $P_k'$) or during a recalculation (carried out in the same time step) of the (fused) variance (of the (fused) variance previously calculated in this time step). In this context, the determined discrepancy or the degree of discrepancy can be added, for example, to the variance or covariance matrix (symbol: $\Sigma_0$) of the at least one model value or of the model value vector (symbol: $\mu_0$) and/or to the variance or covariance matrix (symbol: $\Sigma_1$) of the at least one measured value or of the measured value vector (symbol: $\mu_1$).

The Kalman filter usually operates iteratively, wherein an estimation for a particular time step is based on the estimation of the (immediately) preceding time step. In this context, recourse is made, in particular, to the model values of the preceding time step when forming the model value according to equations EQ1 and EQ2, for example. However, during the fusion according to equations EQ3 to EQ5, for example, model values and measured values of the current time step are used. In the formula stated above for determining the discrepancy d, the variances $\Sigma_0$, $\Sigma_1$ (and possibly $\Sigma'$) of the current time step and the model values and measured values $\mu_0$, $\mu_1$ and $\mu'$ of the current time step are used, in particular, to calculate the discrepancy d. For this purpose, equation EQ6a can be advantageously inserted into equation EQ6.

The discrepancy d calculated therefrom in the current time step can be used for correction in the current or possibly in the (immediately) following time step. Accordingly, the discrepancy d from the current or possibly from the (immediately) preceding time step can be used for correction in the current time step. Alternatively, provision may also be made for the current time step to be calculated repeatedly or in a plurality of computing steps.

In particular, in order to be able to advantageously use the discrepancy d calculated in the current time step directly for correction in the current time step or to advantageously otherwise be able to avoid possibly additional computing steps in the current time step, it is preferred to introduce the Kalman gain (symbol: K') in equation EQ6.

With the introduction of the Kalman gain, the discrepancy can be determined according to the following formula (equation EQ6b):

$$d=(\mu_0-\mu')^2+K((\mu_1-\mu')^2-(\mu_0-\mu')^2) \quad \text{(EQ6b)}$$

in which d describes the discrepancy matrix, $\mu_0$ describes the model value vector, $\mu_1$ describes the measured value vector, $\mu'$ describes the fused model value vector and K describes the Kalman gain. Using the Kalman gain according to equation EQ6b advantageously also makes it possible to avoid matrix inversions, thus making it possible to save computing time.

In a particularly advantageous manner, the formula from equation EQ6 can furthermore be simplified with the aid of the Kalman gain and the formation of coefficients or equation EQ6b with the formation of coefficients in such a manner that no additional divisions or no (unnecessary) multiple calculations are required. The accordingly simplified formula is indicated in equation EQ7 below:

$$d=w_0+K(w_1-w_0) \quad \text{(EQ8)}$$

In this case, the coefficients $w_0$ and $w_1$ or coefficient matrices $W_0$ and $W_1$ can be determined according to the following equations (EQ8 and EQ9):

$$w_0=(\mu_0-\mu')^2 \quad \text{(EQ9)}$$

$$w_1=(\mu_1-\mu')^2 \quad \text{(EQ10)}$$

In this context, provision may be ideally made for the coefficients $w_0$ and $w_1$ or the coefficient matrices $W_0$ and $W_1$ to be calculated only once for each time step. This can advantageously contribute to a microcontroller being able to carry out the computing steps of the filter in a considerably faster manner.

For the situation in which the measured value vector and the model value vector are or may be possibly of a different dimension, equations EQ8 and EQ9 may be reformulated, for example, into the following equations EQ10 and EQ11 using $\mu_0=H_k\hat{x}_k$, $\mu'=H_k\hat{x}_k'$ and $\mu_1=\vec{z}_k$ (by means of the so-called observation or transformation matrix $H_k$):

$$W_0=H_k(\hat{x}_k-\hat{x}_k')(\hat{x}_k-\hat{x}_k'^T)H_k^T \quad \text{(EQ11)}$$

$$W_1=(\vec{z}_k-H_k\hat{x}_k')(\vec{z}_k-H_k\hat{x}_k')^T \quad \text{(EQ12)}$$

Accordingly, according to one particularly preferred embodiment, it can be proposed that the discrepancy is determined according to the following formula (equation EQ7a):

$$D=W_0+H_kK'(W_1-W_0) \quad \text{(EQ13a)}$$

in which D describes the discrepancy matrix, $W_0$ and $W_1$ each describe coefficient matrices, K' describes the Kalman gain matrix and $H_k$ describes the transformation matrix, wherein the coefficient matrices are determined according to the preceding formulas (equations EQ10 and EQ11).

In order to advantageously correct the fused variance (symbol: $P_k'$ or $\Sigma'$), the above equation (EQ5) can be expanded as follows, for example:

$$H_kP_k'H_k^T = H_kP_kH_k^T - H_kK'H_kP_kH_k^T + \underbrace{H_kH_k^T}_{I}D\underbrace{H_kH_k^T}_{I} \quad \text{(EQ 14)}$$

The product of the observation matrix $H_k$ with its transposed $H_k^T$ produces the identity matrix I and can be added for the subsequent conversion of this equation in the explicit form. The explicit representation (cf. equation EQ12a) can be derived by shortening $H_k$ and $H_k^T$. A corresponding explicit representation is particularly advantageous, in particular for a calculation using a microcontroller.

$$P_k'=P_k-K'H_kP_k+H_k^TDH_k \quad \text{(EQ15a)}$$

in which the product of the observation matrix $H_k$ and the Kalman gain matrix K' can likewise be derived by expanding and shortening $H_k$ and $H_k^T$, as follows:

$$K'=P_kH_k^T(H_kP_kH_k^T+R_k)^{-1} \quad \text{(EQ3a)}$$

Alternatively, according to one preferred embodiment, the following formula can be used to correct the fused covariance $P_k'$:

$$P_k'=(I-(K'H_k))P_k+H_k^TDH_k \quad \text{(EQ16c)}$$

in which I describes the identity matrix, K' describes the Kalman gain matrix, $H_k$ describes the observation matrix, $P_k$ describes the covariance matrix and D describes the discrepancy matrix.

According to a further advantageous configuration, it is proposed that the influence of the determined discrepancy on the at least one item of information relating to the reliability of the estimation is weighted by means of at least one weighting factor or a weighting matrix. The at least one weighting factor or the at least one weighting matrix can advantageously cause the determined discrepancy (or the degree of discrepancy) to be advantageously applied, as specifically as possible, to those scatter values (for example those entries in the covariance matrix) whose associated model values or measured values are (presumably) erroneous or at least (presumably) more erroneous than the other values. This may contribute, for example, to measured values being able to be given a higher weighting than abnormal model values or vice versa. The weighting factor or the at least one weighting matrix can be established, for example, when designing the Kalman filter or can preferably be modified or adapted dynamically by a superordinate function or a control device (of the system) which is superordinate to the Kalman filter during operation, in particular in order to achieve at least one of the effects mentioned above.

The weighting factor or the weighting matrix (symbol: $\Sigma_1$) can be integrated in equation EQ12c above, for example according to the following equation EQ13:

$$P_k'=(I-(K'H_k))P_k+H_k^TE_1DH_k \quad \text{(EQ17)}$$

For example, the weighting matrix $\Sigma_1$ can be multiplied, element by element, by the discrepancy.

In a situation in which the sensor signals have unusually high interference, but the model values can be trusted particularly well, or the sensor signals have (at least presumably) higher interference than the model values, it is preferred for the discrepancy to (at least also) be applied to the measurement uncertainty (symbol: R) or the covariance matrix (symbol: $\Sigma_1$) of the measured value vector. In this case, the discrepancy D weighted using the matrix $E_2$, for example, can be advantageously specifically added to the variance matrix of the measurement noise (symbol: R) in equation EQ3a:

$$K'=P_k H_k^T (H_k P_k H_k^T + R_k + E_2 D)^{-1} \quad (EQ14)$$

As an alternative or in addition to expanding equation EQ12c, equation EQ12c can also be expanded using the matrix $E_3$ and the discrepancy D such that an increased discrepancy D results in greater consideration of the model values (in particular without the model uncertainty $P_k$ having to be directly increased):

$$K'=(P_k H_k^T + H_k^T E_3 D)(H_k P_k H_k^T + E_3 D + R_k)^{-1} \quad (EQ15)$$

In order to avoid any algebraic loops in the exemplary embodiments according to the above equations (in particular EQ14 and EQ15), it is possible to resort to the D from the (immediately) preceding time step, for example, and/or to repeatedly calculate the current time step.

A possibly alternative and comparatively simple possibility for considering the discrepancy may involve, for example, adding the discrepancy in equation EQ2. In this case, the discrepancy can be advantageously weighted using the weighting matrix $E_4$. This is illustrated in equation EQ16 below:

$$P_k = F_k P_{k-1} F_k^T + Q_k + E_k H_k^T D H_k \quad (EQ16)$$

The decision as regards the point in the system of equations at which the discrepancy acts or is intended to act on the system of equations and to what extent can be permanently predefined, for example, when designing the Kalman filter or can be predefined, in particular dynamically, by a (superordinate) control device of the system.

One particularly preferred exemplary embodiment in which the discrepancy is inserted at a plurality of points in the system of equations in order to be able to act on the model uncertainty (symbol: P), the measurement uncertainty (symbol: R) and the fused model uncertainty (symbol: P'), in particular, and in which the discrepancy at the respective point is weighted using its own weighting matrix (E1 to E4) is described below on the basis of the following exemplary pseudocode which can be implemented, in particular, as a computer program within a continuous loop:

$$\hat{x}_{k-1} = \hat{x}_k'$$

$$P_{k-1} = P_k'$$

$$\hat{x}_k = F_k \hat{x}_{k-1} + B_k \vec{u}_k$$

$$P_k = F_k P_{k-1} F_k^T + Q_k + E_4 H_k D H_k^T$$

$$K' = (P_k H_k^T + H_k^T E_3 D)(H_k P_k H_k^T + E_3 D + R_k + E_2 D)^{-2}$$

$$\hat{x}_k' = \hat{x}_k + K'(\vec{z}_k - H_k \hat{x}_k)$$

$$W_0 = H_k (\hat{x}_k' - \hat{x}_k)(\hat{x}_k' - \hat{x}_k)^T H_k^T$$

$$W_1 = (H_k \hat{x}_k' - \vec{z}_k)(H_k \hat{x}_k' - \vec{z}_k)^T$$

$$D = W_0 + H_k K'(W_1 - W_0)$$

$$P_k' (I-(KH_k)) P_k + E_1 H_k D H_k^T$$

In this case, the values of the matrices $E_1$ to $E_4$ can determine the influence of the discrepancy on the respective computing step.

According to a further advantageous configuration, it is proposed that the determined discrepancy is filtered by means of a low-pass filter. Since large discrepancy differences can arise, in principle, with each calculation step, it may be advantageous to filter the discrepancy using a low-pass filter. The filtered discrepancy can be used for correction, for example in one or more of equations EQ13 to EQ16.

A further aspect proposes a computer program for carrying out a method presented here. In other words, this relates, in particular, to a computer program (product) comprising instructions which, when the program is executed by a computer, cause the latter to carry out a method described here.

A further aspect proposes a machine-readable storage medium on which the computer program proposed here is stored. The machine-readable storage medium is usually a computer-readable data carrier.

A further aspect also proposes a system for determining the position of a mobile object, for instance a vehicle, configured to carry out a method described here. The system for determining the position of a mobile object may be provided and configured, for example, to determine the inherent position of a mobile object and/or to measure a position relative to other objects, in particular moving mobile objects, for instance road users. The system may comprise, for example, a motion and position sensor which is configured to carry out a method described here. Furthermore, the motion and position sensor may receive, for example, GNSS data and/or environmental sensor data (from environmental sensors of the mobile object or vehicle). In order to carry out the method, the system may comprise, for example, a computing device, for instance a (micro)controller which can access the computer program also described here. In this context, the storage medium may likewise be part of the system or may be connected to the latter, for example.

The details, features and advantageous configurations discussed in connection with the method can accordingly also arise with the computer program presented here and/or the storage medium and/or the system and vice versa. In this respect, reference is made in full to the statements there in order to characterize the features in more detail.

BRIEF DESCRIPTION OF THE DRAWINGS

The solution presented here and its technical environment are explained in more detail below on the basis of the figures. It should be pointed out that the disclosure is not intended to be restricted by the exemplary embodiments shown. In particular, unless explicitly described otherwise, it is also possible to extract partial aspects of the scenarios explained in the figures and to combine them with other parts and/or knowledge from other figures and/or the present description. In the drawings.

DETAILED DESCRIPTION

Figure 1:
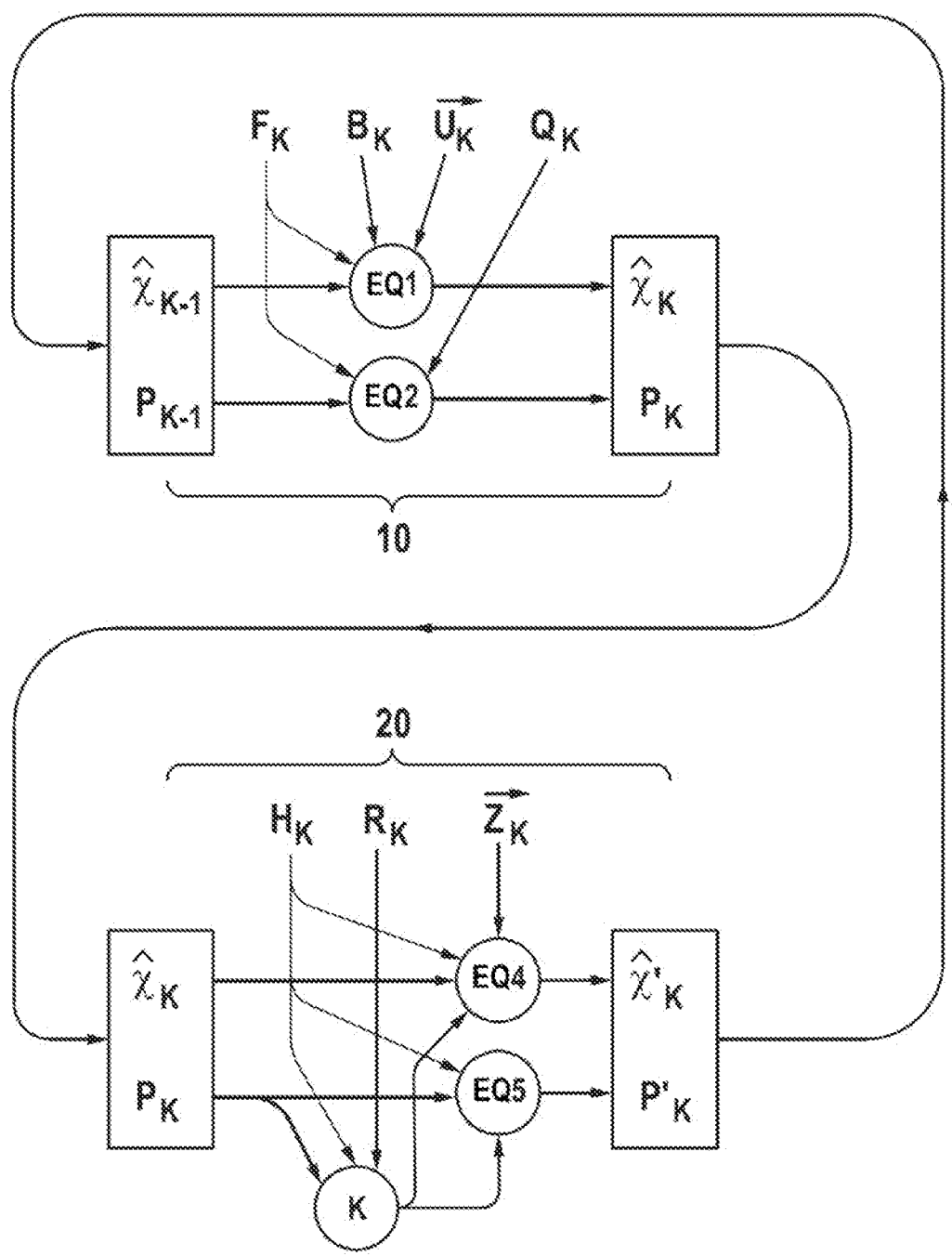
FIG. 1: shows a typical signal propagation chart of a Kalman filter according to the prior art.

FIG. 1 schematically shows a typical structure of a Kalman filter according to the prior art. The Kalman filter equations on which this structure is based can be described in matrix notation as follows:

$$\hat{x}_k = F_k \hat{x}_{k-1} + B_k \vec{u_k} \quad \text{(EQ 18)}$$

$$P_k = F_k P_{k-1} F_k^T + Q_k \quad \text{(EQ 19)}$$

$$\underbrace{H_k K'}_{K} = \underbrace{H_k P_k H_k^T}_{\Sigma_0} \left( \underbrace{H_k P_k H_k^T}_{\Sigma_0} + \underbrace{R_k}_{\Sigma_1} \right)^{-1} \quad \text{(EQ 20)}$$

$$\underbrace{H_k \hat{x}_k'}_{\mu'} = \underbrace{H_k \hat{x}_k}_{\mu_0} + \underbrace{H_k K'}_{K} \left( \underbrace{\vec{z_k}}_{\mu_1} - \underbrace{H_k \hat{x}_k}_{\mu_0} \right) \quad \text{(EQ 21)}$$

$$\underbrace{H_k P_k' H_k^T}_{\Sigma'} = \underbrace{H_k P_k H_k^T}_{\Sigma_0} - \underbrace{H_k K'}_{K} \underbrace{H_k P_k H_k^T}_{\Sigma_0} \quad \text{(EQ 22)}$$

In this case, equation (EQ1) describes the estimated state vector $\hat{x}_k$ on the basis of the state vector $\hat{x}_{k-1}$ of the preceding time step (iterative estimation), the system matrix $F_k$, the control matrix $B_k$ and the control vector $\vec{\mu_k}$. In this case, the state vectors generally describe mean values of Gaussian distributions. In other words, according to equation (EQ1), the new best estimation $\hat{x}_k$ is a prediction which was created from the previous best estimation $\hat{x}_{k-1}$ plus a correction for known external influences.

In this context, equation (EQ2) describes the covariance matrix $P_k$ associated with the Gaussian distribution of the estimated state vector $\hat{x}_k$. This results on the basis of the covariance matrix $P_{k-1}$ of the preceding time step (iterative estimation), the system matrix $F_k$ and the covariance matrix of the system noise $Q_k$. In other words, according to equation (EQ2), the new (estimation) uncertainty $P_k$ is predicted from the old uncertainty $P_{k-1}$ with an additional uncertainty from the environment.

Equation (EQ3) describes the so-called Kalman gain K or the Kalman gain matrix K'. This is formed on the basis of the covariance matrix $P_k$, the observation matrix $H_k$ and the covariance matrix of the measurement noise $R_k$. The covariance matrix $P_k$ can form, with the observation matrix $H_k$, the covariance matrix $\Sigma_0$ of the model value vector $\mu_0$.

Equation (EQ4) describes the correction of the estimated state vector $\hat{x}_k$ or of the model value vector $\mu_0$ using measured values which are represented by the measured value vector $z_k$ or $\mu_1$. A corrected or fused model value vector $\mu'$ or a new state vector $\hat{x}_k'$, which can be used as an input for a subsequent estimation step, therefore results from equation (EQ4).

Equation (EQ5) describes the determination of the corrected or fused covariance matrix $P_k'$ or $\Sigma'$ on the basis of the covariance matrix $P_k$ or $\Sigma_0$ of the state vector $\hat{x}_k$ or of the model value vector $\mu_0$. In this case, the covariance matrix $R_k$ or $\Sigma_1$ of the measured value vector $z_k$ or $\mu_1$ is concomitantly included using the Kalman gain K.

Equations (EQ1) and (EQ2) therefore describe the iterative estimation process of the Kalman filter. This estimation process is indicated with the reference sign 10 in FIG. 1. Equations (EQ3) to (EQ5) describe the subsequent correction or fusion of the iteratively estimated model values with measured values which are captured using sensors. This correction or fusion is indicated with the reference sign 20 in FIG. 1. The corrected or fused (new) model values can be used in a subsequent iteration step in the estimation process 10. This is illustrated with the returning arrow in FIG. 1.

Figure 2:
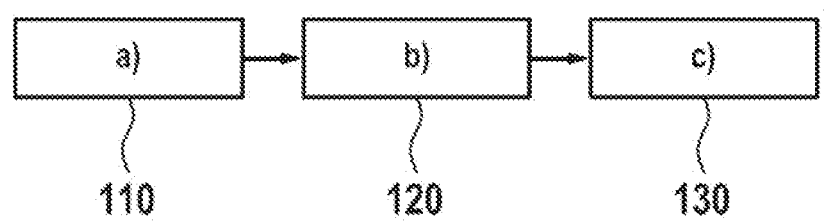
FIG. 2: shows an exemplary sequence of the method presented here.

FIG. 2 schematically shows an exemplary sequence of the method presented here. The method is used to determine at least one system state by means of a Kalman filter which is supplied with at least one measured value measured by at least one sensor of the system. The system may be, for example, a system for determining the position of a vehicle.

The order of steps a), b) and c) represented with the blocks 110, 120 and 130 is exemplary and can be run through at least once in the illustrated order, for example, in order to carry out the method. In addition, steps a), b) and c) can also be at least partially carried out in a parallel manner or at the same time.

In block 110, according to step a), the system state is estimated by means of the Kalman filter, wherein an estimation result and at least one associated item of information relating to the reliability of the estimation result are output. In block 120, according to step b), a discrepancy between at least one model value associated with the estimation and at least one measured value associated with the estimation is determined.

For example, in this context, the discrepancy can be determined using the following elements: at least one model value, at least one measured value, at least one fused model value, and at least one Kalman gain or, as an alternative to the Kalman gain, using at least one covariance of the at least one measured value, and at least one covariance of the at least one model value.

For example, the discrepancy can be determined in this case according to the following formula:

$$d = \Sigma' \left( \frac{(\mu_0 - \mu')^2}{\Sigma_0} + \frac{(\mu_1 - \mu')^2}{\Sigma_1} \right)$$

in which d describes the discrepancy, $\mu_0$ describes the model value, $\mu_1$ describes the measured value, $\mu'$ describes the fused model value, $\Sigma_0$ describes the variance of the model value, $\Sigma_1$ describes the variance of the measured value and $\Sigma'$ describes the variance of the fused model value, and the variance $\Sigma'$ of the fused model value can be determined according to the formula $$\Sigma' = \frac{1}{\frac{1}{\Sigma_0} + \frac{1}{\Sigma_1}}$$

In block 130, according to step c), at least one item of information relating to the reliability of the estimation is corrected using the determined discrepancy. In this case, the correction is advantageously carried out continuously. The discrepancy can also be advantageously used to correct at least one confidence value of at least one model value and/or of at least one measured value of the Kalman filter.

Provision may also be made for the influence of the determined discrepancy on the at least one item of information relating to the reliability of the estimation to be weighted by means of a weighting matrix. Furthermore, the determined discrepancy may also be filtered by means of a low-pass filter, for example.

Figure 3:
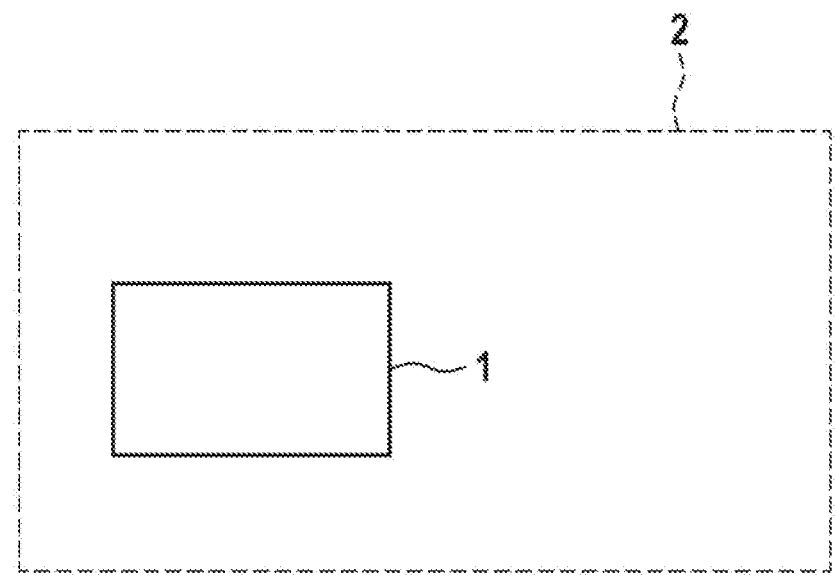
FIG. 3: shows an exemplary system for determining the position of a vehicle.

FIG. 3 schematically shows an exemplary system 1 for determining the position of a vehicle 2. The system 1 is provided and configured to carry out a method described here.

Figure 4:
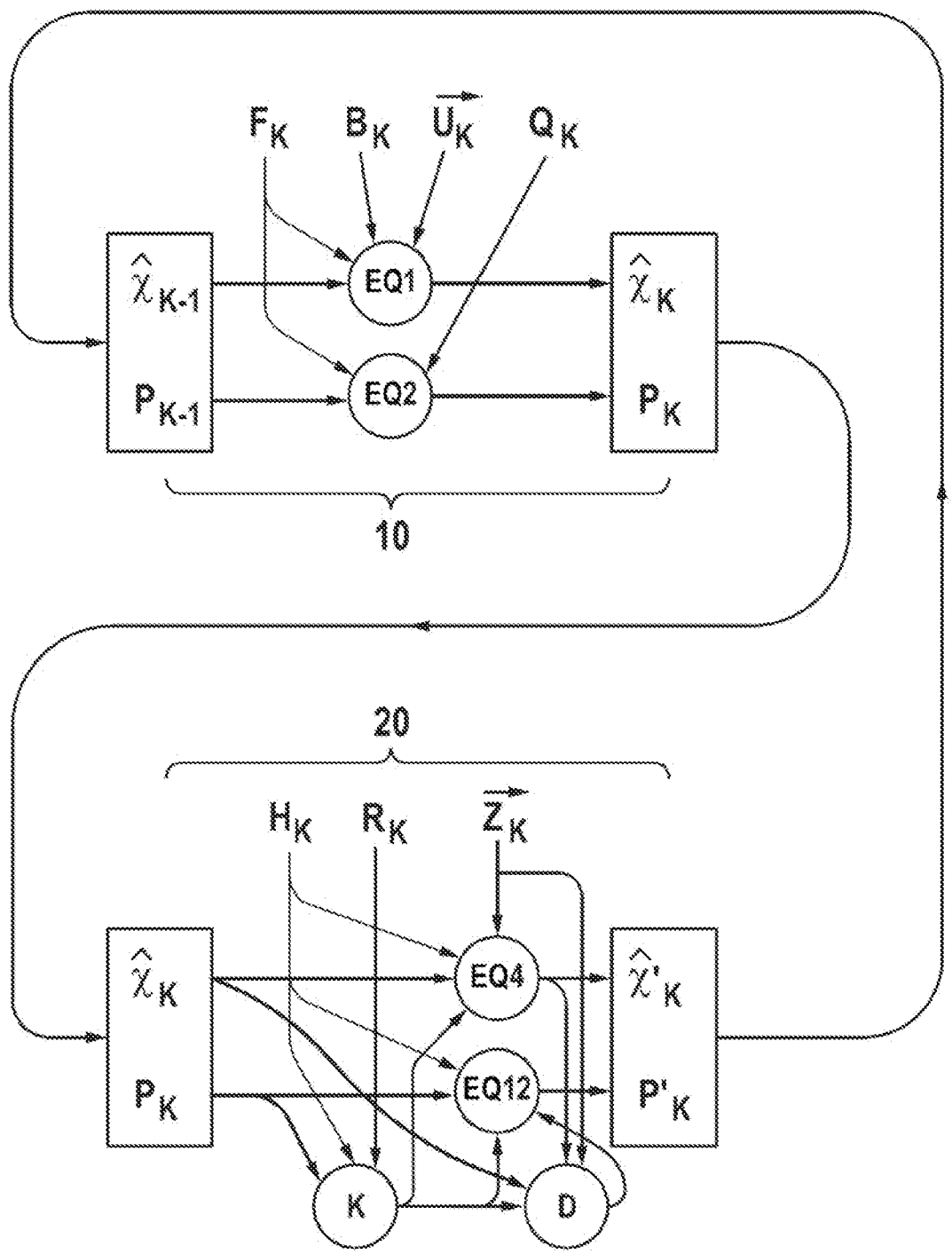
FIG. 4: shows an exemplary signal propagation chart of a Kalman filter.

FIG. 4 shows an exemplary expansion of the signal propagation chart from FIG. 1. An embodiment of the method described herein can be implemented, for example, using the Kalman filter signal propagation chart according to FIG. 4. In this case, a discrepancy D between the measured values z and model values x increases the estimation uncertainty P'. In this respect, equation EQ5 is replaced with equation EQ12, for example. In the case of model errors which result in a large deviation of the model values x from the measured values z, the model values x can be advantageously adjusted more quickly to the measured values z. This advantageously contributes to the Kalman filter model becoming more robust with respect to design errors.

Figure 5:
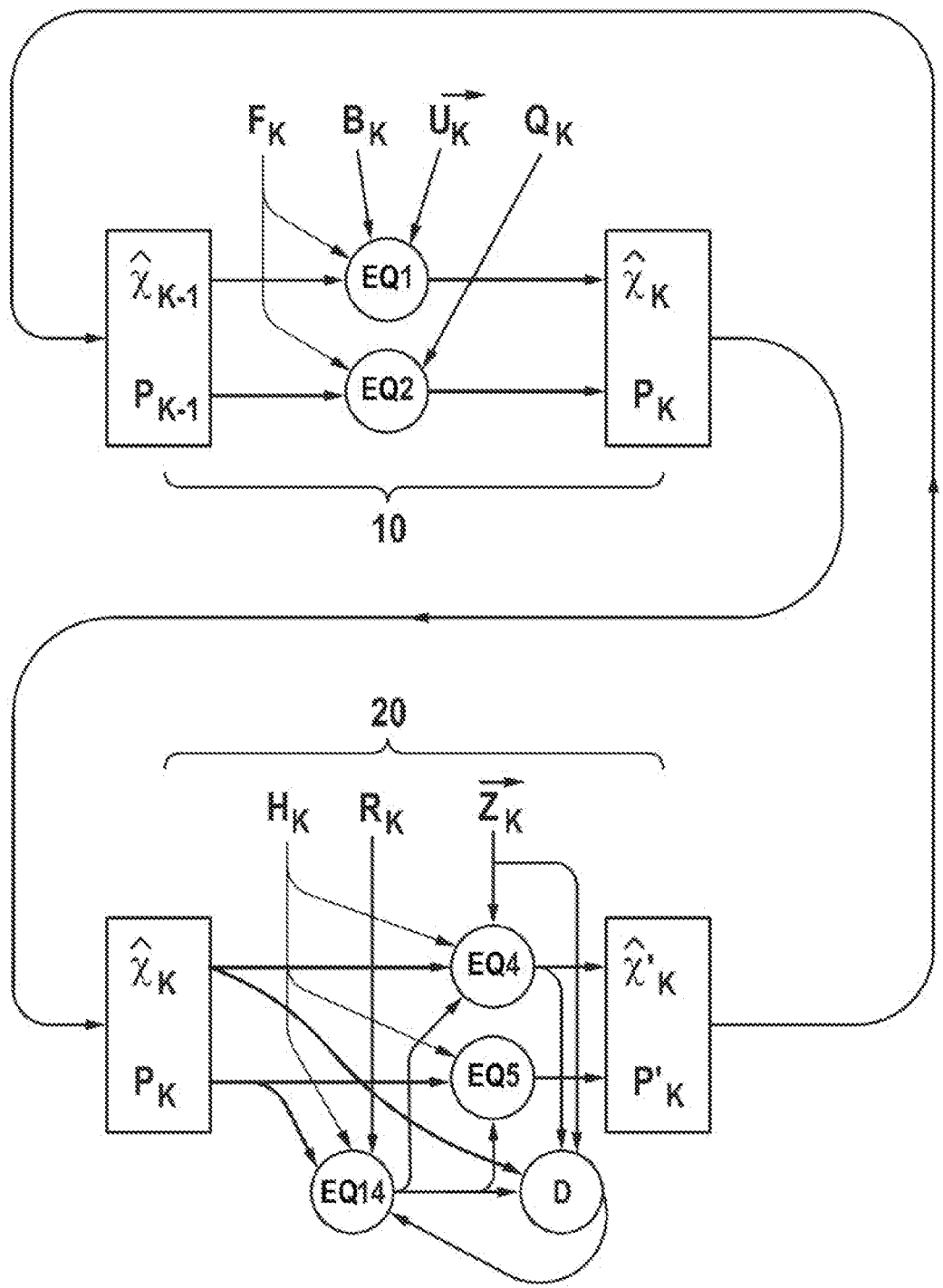
FIG. 5: shows a further exemplary signal propagation chart of a Kalman filter.

FIG. 5 shows a further alternative exemplary expansion of the signal propagation chart from FIG. 1. A further embodiment of the method described here can be implemented, for example, using the Kalman filter signal propagation chart according to FIG. 5. In this case, a discrepancy D between the measured values z and model values x reduces the influence of the measured values z on the model values. In this respect, the equation for calculating the Kalman gain K' (equation EQ3 above) is replaced with equation EQ14, for example. As a result, the Kalman filter model becomes more robust with respect to measurement errors. In order to avoid any algebraic loops in the exemplary embodiments according to FIG. 5, recourse can be had, for example, to the D from the (immediately) preceding time step and/or computing steps of the current time step can be calculated repeatedly.

Figure 6:
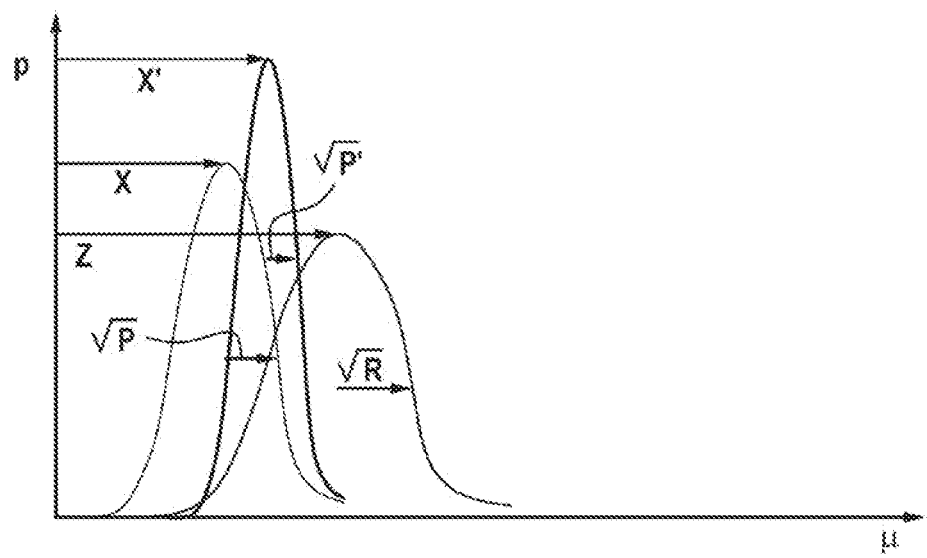
FIGS. 6, 7: show illustrations of probability density distributions according to the prior art.

FIG. 6 shows, by way of example, an illustration of probability density distributions according to the prior art, as may arise when using a Kalman filter illustrated in FIG. 1. In this context, FIG. 6 shows plausible probability density distributions. In a plausible probability density distribution, the areas of the Gaussian bells of the measurement z and the model X greatly overlap. The Gaussian bell x' fused therefrom is between the two other Gaussian bells. It is also narrower and higher.

Figure 7:
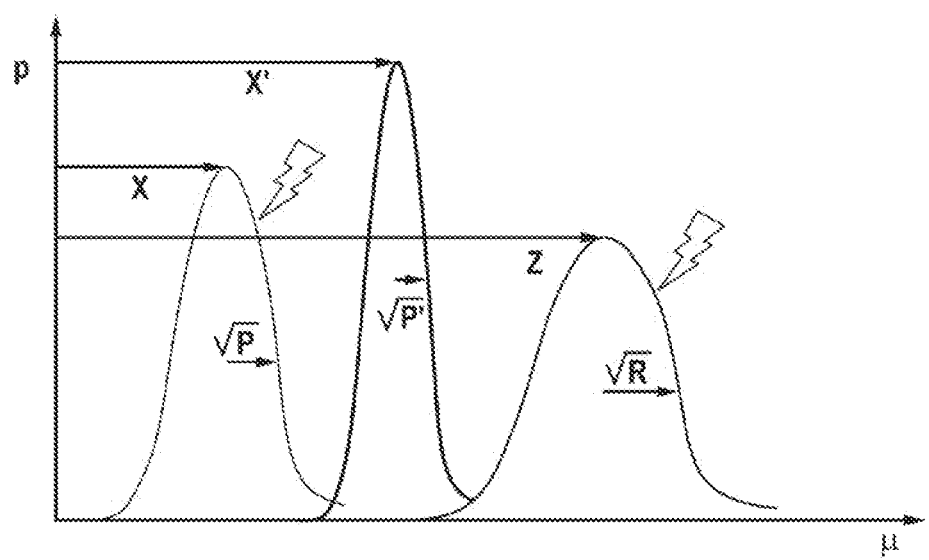

FIG. 7 shows, by way of example, a further illustration of probability density distributions according to the prior art, as may arise when using a Kalman filter illustrated in FIG. 1. In this context, FIG. 7 shows non-plausible probability density distributions. In a non-plausible probability density distribution, both the measurement z and the model x are very certain that they are located correctly, but output values which differ greatly from one another. The areas of the Gaussian bells of the measurement z and the model x scarcely overlap, but the Kalman filter nevertheless calculates the fused Gaussian bell x' in the conventional way.

The Gaussian bell x' fused therefrom is between the two other Gaussian bells. However, it is too narrow and/or too high. The fused Gaussian bell x' must actually be broader and/or have a greater overlap with the other bells. The method described here can contribute to solving this problem.

Figure 8:
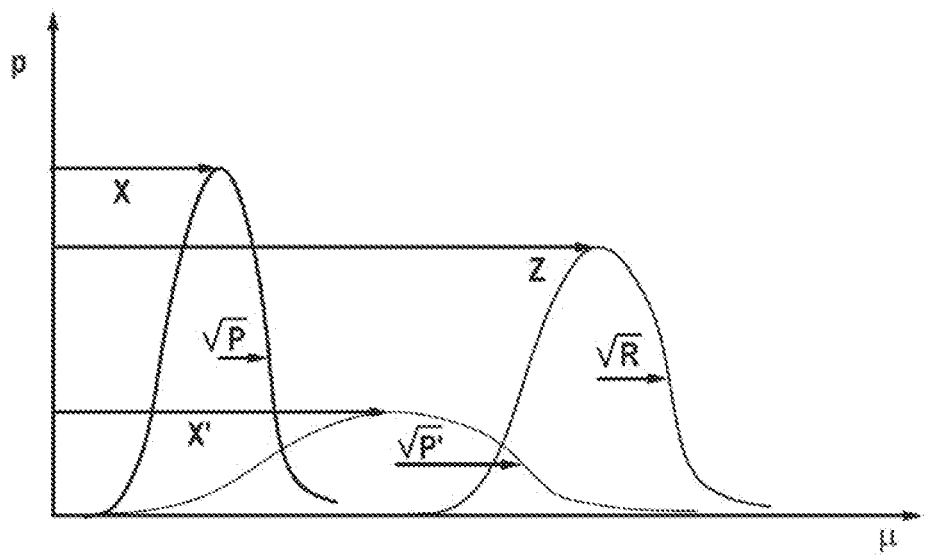
FIG. 8: shows an illustration of probability density distributions which can be achieved with the exemplary embodiment from FIG. 4, and FIG. 9: shows an illustration of probability density distributions which can be achieved with the exemplary embodiment from FIG. 5.

FIG. 8 shows an illustration of probability density distributions which can be achieved using the exemplary embodiment from FIG. 4. It can be seen that it is possible to achieve the situation in which the fused Gaussian bell x' is broader and has a greater overlap with the other bells by taking into account the discrepancy D according to FIG. 4. This advantageously allows the fact that a non-plausible probability density distribution (of the Gaussian bells z and x; cf. FIG. 7) is present to now also be reflected in the fused Gaussian bell x'.

Figure 9:
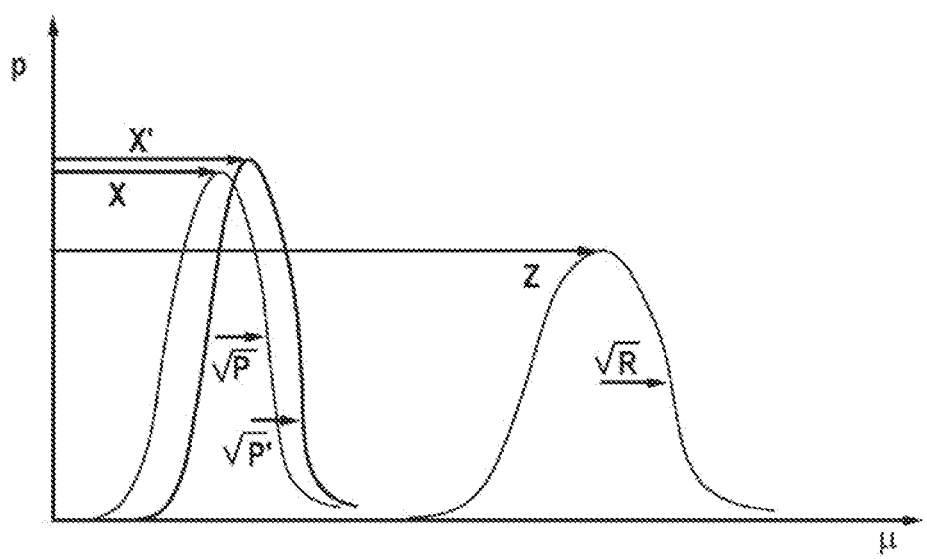

FIG. 9 shows an illustration of probability density distributions which can be achieved using the exemplary embodiment from FIG. 5. It can be seen that it is possible to achieve the situation in which the fused Gaussian bell x' has a greater overlap with at least one of the other bells, here the Gaussian bell x of the model, by taking into account the discrepancy D according to FIG. 5. This advantageously allows the fact that a non-plausible probability density distribution (of the Gaussian bells z and x; cf. FIG. 7) is present to now also be reflected in the fused Gaussian bell x'.

The method described here and the system described here allow one or more of the following advantages, in particular: the Kalman filter is advantageously more robust with respect to interference signals, measurement errors, model inaccuracies and/or other design errors, costs can be advantageously saved when parameterizing the Kalman filter, and the discrepancy calculation can also be advantageously inserted in the expansions of the Kalman filter.

What is claimed is:

1. A method of using a Kalman filter to determine at least one vehicle state of a vehicle, the method comprising:
    supplying at least one measured value measured by at least one sensor of the vehicle to the Kalman filter;
    estimating the at least one vehicle state using the Kalman filter by outputting an estimation result and at least one associated item of information relating to a reliability of the estimation result;
    determining a discrepancy between at least one model value associated with the estimation result and at least one measured value associated with the estimation result;
    correcting the at least one associated item of information relating to the reliability of the estimation result using the determined discrepancy; and
    performing, based on the estimation result, at least one of (i) a partially automated driving operation and (ii) an autonomous driving operation, using a controller of the vehicle.

2. The method according to claim 1, wherein the vehicle state includes a position of the vehicle.

3. The method according to claim 1, wherein correcting the at least one associated item of information relating to the reliability of the estimation result comprises:
    continuously correcting the at least one associated item of information relating to the reliability of the estimation result.

4. The method according to claim 1, further comprising:
    using the determined discrepancy to correct at least one confidence value of the at least one model value and/or of the at least one measured value.

5. The method according to claim 1, wherein determining the discrepancy comprises:
    determining the discrepancy using the following elements (i) the at least one model value, (ii) the at least one measured value, (iii) at least one fused model value, and (iv) at least one Kalman gain or, as an alternative to the at least one Kalman gain, using at least one covariance of the at least one measured value, and at least one covariance of the at least one model value.

6. The method according to claim 1, further comprising: weighting, using at least one weighting matrix, an influence of the determined discrepancy on the at least one associated item of information relating to the reliability of the estimation result.

7. The method according to claim 1, further comprising: filtering the determined discrepancy using a low-pass filter.

8. The method according to claim 1, wherein the method is carried out by a computer program stored on a non-transitory machine-readable storage medium.

9. A system for determining a position of a vehicle, comprising:
- at least one sensor; and
- a microcontroller operably connected to the at least one sensor and configured to use a Kalman filter to determine at least one vehicle state of the vehicle, the microcontroller configured to:
  - supply at least one measured value measured by the at least one sensor to the Kalman filter,
  - estimate the at least one vehicle state using the Kalman filter by outputting an estimation result and at least one associated item of information relating to a reliability of the estimation result,
  - determine a discrepancy between at least one model value associated with the estimation result and at least one measured value associated with the estimation result, and
  - correct the at least one associated item of information relating to the reliability of the estimation result using the determined discrepancy,
- wherein, based on the estimation result, a controller of the vehicle performs at least one of (i) a partially automated driving operation and (ii) an autonomous driving operation.

* * * * *